US 8,984,259 B2

(12) United States Patent
Hulse et al.

(10) Patent No.: US 8,984,259 B2
(45) Date of Patent: Mar. 17, 2015

(54) METHOD, SYSTEM, AND COMPUTER PROGRAM PRODUCT FOR OPTIMIZING RUNTIME BRANCH SELECTION IN A FLOW PROCESS

(75) Inventors: Brian Hulse, Hampshire (GB); Callum P. Jackson, Hampshire (GB); Christopher Kalus, Hampshire (GB); Ian W. Parkinson, Hampshire (GB); Robert W. Phippen, Hampshire (GB); Amanda J. Watkinson, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 672 days.

(21) Appl. No.: 12/264,385

(22) Filed: Nov. 4, 2008

(65) Prior Publication Data

US 2010/0115251 A1 May 6, 2010

(51) Int. Cl.
*G06F 9/50* (2006.01)

(52) U.S. Cl.
CPC ........ *G06F 9/5038* (2013.01); *G06F 2209/508* (2013.01)
USPC .......................................................... 712/214

(58) Field of Classification Search
CPC .................................................. G06F 9/5038
See application file for complete search history.

(56) References Cited

U.S. PATENT DOCUMENTS

| 5,511,198 A * | 4/1996 | Hotta ............................ 717/156 |
| 5,890,133 A | 3/1999 | Ernst |
| 5,894,576 A * | 4/1999 | Bharadwaj .................... 717/156 |
| 6,006,033 A * | 12/1999 | Heisch .......................... 717/158 |
| 6,327,582 B1 * | 12/2001 | Worzel ............................. 706/13 |
| 6,463,470 B1 | 10/2002 | Mohaban et al. |
| 6,901,052 B2 | 5/2005 | Buskirk et al. |
| 2005/0149521 A1 * | 7/2005 | Wang et al. ....................... 707/6 |
| 2005/0283786 A1 | 12/2005 | Dettinger et al. |
| 2006/0106748 A1 | 5/2006 | Chafle et al. |
| 2007/0073883 A1 | 3/2007 | Chafle et al. |

(Continued)

OTHER PUBLICATIONS

Olaussen et al., "A policy-based priority and precedence framework for military IP networks," MILCOM 2004. 2004 IEEE Military Communications Conference (IEEE Cat. No. 04CH37621), pp. 827-833 vol. 2, Oct. 31, 2004.

(Continued)

*Primary Examiner* — Andrew Caldwell
*Assistant Examiner* — John Lindolf
(74) *Attorney, Agent, or Firm* — Cantor Colburn LLP; Jeannie Ray

(57) ABSTRACT

A method, system, and computer program product for optimizing runtime branch selection in a flow process are provided. The method includes gathering performance metrics of flow branch behavior for executed flows in a runtime system over time and using aggregated performance metrics for the behavior to determine an optimal ordering of branches for a currently running flow. The optimal ordering is determined by identifying one or more branch points in the flow, generating ordering permutations for at least a portion of the branches in the branch point for the flow to identify any permutations that have not been executed, gathering metrics for permutation(s) of the branch point in the flow, comparing the metrics to performance metrics of executed flows having substantially similar flow branch behavior, and identifying optimal branch ordering for the permutation(s) based upon the comparison. The method also includes executing the flow according to the optimal branch ordering.

20 Claims, 2 Drawing Sheets

(56) References Cited

U.S. PATENT DOCUMENTS

| | | |
|---|---|---|
| 2007/0174101 A1 | 7/2007 | Li et al. |
| 2008/0071597 A1 | 3/2008 | Chafle et al. |
| 2009/0044263 A1 | 2/2009 | Lingafelt et al. |
| 2009/0227228 A1 | 9/2009 | Hu et al. |
| 2009/0228953 A1 | 9/2009 | Hu et al. |
| 2009/0228954 A1 | 9/2009 | Hu et al. |
| 2009/0292797 A1* | 11/2009 | Cromp et al. ............ 709/223 |

OTHER PUBLICATIONS

IBM, "Network Communication Validation by Automated Policy Examination," IP.com No. IPCOM000019247D, Sep. 8, 2003, 8 pages.

Siemens AG, Juergen Carstens, "Policy Based Overload Control in Communication Networks," IP.com No. IPCOM000139797D, Sep. 25, 2006, 7 pages.

Olkhovich, L., "Semi-Automatic Business Process Performance Optimization Based on Redundant Control Flow Detection," Proceedings of the Advanced International Conference on Telecommunications and International Conference on Internet and Web Applications and Services 2006 (AICT/ICIW 2006), Feb. 19-25, 2006, 6 pages.

Weyland, J.H., et al., "Towards simulation-based business process management," Proceedings of the 2003 Winter Simulation Conference, pp. 225-227, Dec. 7-10, 2003.

* cited by examiner

METHOD, SYSTEM, AND COMPUTER PROGRAM PRODUCT FOR OPTIMIZING RUNTIME BRANCH SELECTION IN A FLOW PROCESS

BACKGROUND

The present invention relates generally to flow processing and, more specifically, to a method, system, and computer program product for optimizing runtime branch selection in a flow process.

There are many enterprise service bus (ESB) systems that incorporate two stages in their construction. One stage is tooling, in which a net of composable units are wired together to form an overall flow, which conceptually describes a particular function of an ESB module. The second stage is where tooling-generated artifacts are rendered into a runtime system, and reflects the executable instantiation of the conceptual flow. One example of such a system is the pairing of IBM® WebSphere Integration Developer, which provides the ESB tooling support, and IBM® WebSphere Enterprise Service Bus, which provides the runtime environment. As a natural consequence of flow development, there may be a number of routes, or branches within a flow. In some instances, all branches may be activated for a particular flow, and in some cases, branches will be conditional based upon some runtime context. Each of the runtime components representing the composable units may have different behavioral characteristics. For example some components may log the flow of data to a database and others may transform the data based on a provided schema. Equally, branches may be commutable inasmuch as the order in which they are performed is not relevant to their business function. Regardless of the commutability of these branches with respect to a business function, there may well be a performance difference when activating branches in different orders.

An example of such a difference can be drawn from a typical enterprise service bus. Consider the simple case of a runtime flow consisting of two branches A and B, in which A simply logs the data but B transforms it before moving into some other referenced service. If B is performed before A, the runtime infrastructure will need to make a clone of the data before the transformation so that the logging performed by A acts on the original data. However, if A is performed before B, no such issue will occur since A does not change the data. In this way, performing A before B is the most advantageous order in which to perform the flow in the runtime system.

Thus, it would be desirable to provide a means for re-ordering branch executions that would optimize performance of the underlying flow.

SUMMARY

According to one embodiment of the present invention, a method for optimizing runtime branch selection in a flow process is provided. The method includes gathering and storing performance metrics of flow branch behavior for executed flows in a runtime system over a period of time, and using aggregated performance metrics for the flow branch behavior to determine an optimal ordering of branches for a currently running flow. The optimal ordering is determined by identifying at least one branch point in the currently running flow, generating ordering permutations for at least a portion of the branches in the branch point for the currently running flow to identify any permutations that have not been executed, gathering metrics for at least one permutation of the branch point in the currently running flow, comparing the metrics to performance metrics of executed flows having substantially similar flow branch behavior, and identifying optimal branch ordering for the permutations based upon the comparison. The method also includes executing the flow according to the optimal branch ordering.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments of the invention enable a runtime system of an enterprise service bus (ESB) to drive branch ordering in a flow (e.g., message flow), either in a statically configured manner or in an adaptive manner based on gathered metrics, to the allow the system to implement the most advantageous configuration. In a statically configured model, branch ordering may be implemented based upon an understanding of the internal behavior of the branches. In the adaptive model, the system collects metrics of flow branch behavior over an extended run period and identifies any advantageous performance ordering and adapting the runtime system to implement the ordering.

Figure 1:
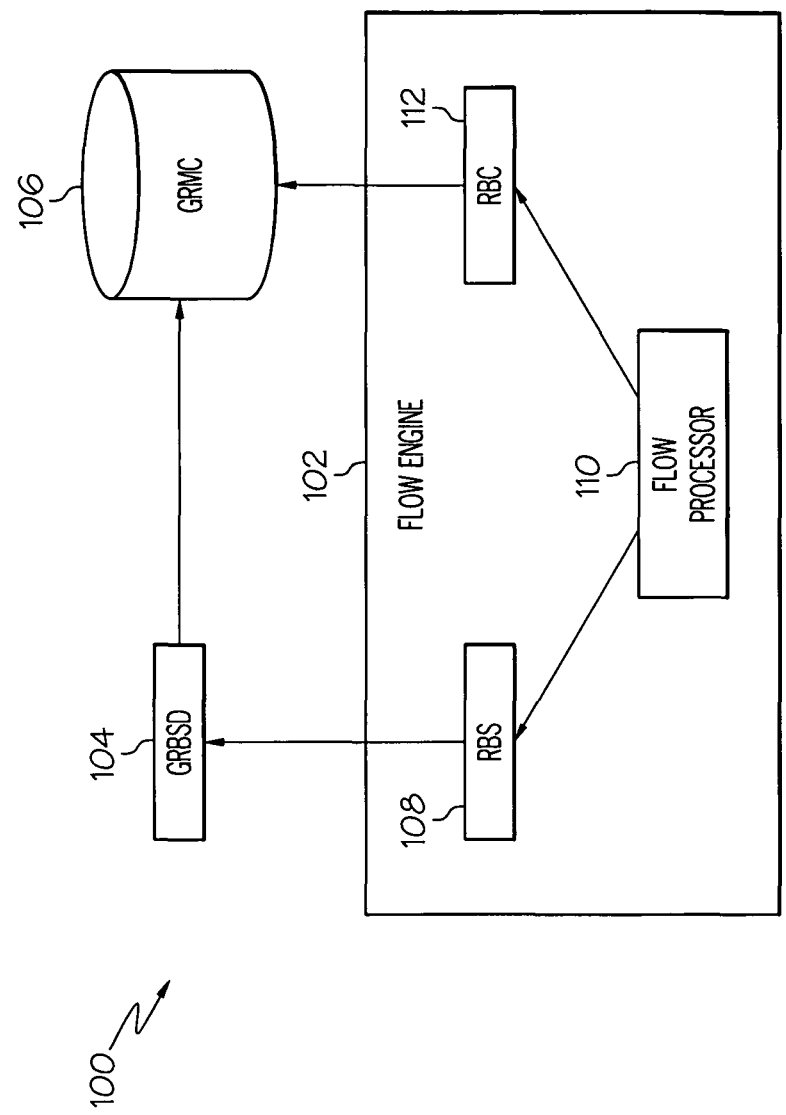
FIG. 1 is a block diagram depicting a system and components for optimizing branch selection in a flow process in accordance with an exemplary embodiment.

With reference now to FIG. 1, an exemplary runtime system 100 including components for optimizing branch selection in a flow process will now be described. In an exemplary embodiment, the runtime system 100 forms part of an ESB which, in turn, may be part of a software architecture construct implemented by middleware that is based on Web Service standards. The middleware infrastructure may provide services in a service-oriented architecture (SOA) via messaging engine (in this example, the ESB). For example, the ESB of the runtime system 100 may be IBM's® Enterprise Service Bus, which provides the runtime environment for instantiating conceptual flows of an application, such as IBM® WebSphere Integration Developer (which provides the tooling support).

In an exemplary embodiment, the runtime system 100 includes a flow engine 102 in communication with a global runtime branch switch director (GRBSD) 104 and a global runtime metric collector (GRMC) 106. The flow engine 102 may be implemented by one or more computer processing units and executes service requests in conjunction with a flow. A flow may be defined as a sequence of activities or tasks that are executed to produce an outcome or solution. The flow may be, e.g., a sequence of activities or instructions performed in furtherance of business processes of an enterprise.

In an exemplary embodiment, the flow engine 102 includes a runtime branch switch (RBS) 108, a flow processor 110, and a runtime branch collector (RBC) 112. The runtime branch switch 108 switches code components in the runtime flow allowing for the global runtime branch switch director 104 to select a desired branch ordering. The runtime branch switch 108 may be implemented as program code that receives data from a source (e.g., global runtime branch switch director 104) and forwards the data to another location (e.g., flow processor 110). The runtime branch collector 112 includes code components which gather metrics at the start and end of every flow and pass the information back to the global runtime metric collector 106.

The global runtime branch switch director 104 may be implemented as a centralized component that uses information from global runtime metric collector 106 to modify the ordering of flows. The global runtime branch switch director 104 acts a controller of the flow in terms of the branch ordering. As shown in FIG. 1, the global runtime branch switch director 104 may reside in a network that is physically and/or logically addressable to the flow engine 102. The global runtime branch switch director 104 may be a controller for multiple flow engines 102, each of which is in communication with the global runtime branch switch director 104 over the network.

It will be understood that the components 102-112 of the system 100 of FIG. 1 may be implemented using hardware (e.g., computer processing unit(s), hard disk drives, etc.), software, or a combination thereof. The software elements are collectively referred to herein as a runtime system application.

In an exemplary embodiment, the global runtime metric collector 106 refers to a central repository for containing performance metrics for all types of flows and their branches in the runtime system 100. These performance metrics are described further herein. Similar to the global runtime branch switch director 104, the global runtime metric collector 106 may also reside in the network and may be physically and/or logically addressable to the flow engine 102 over the network. In addition, the global runtime metric collector 106 may be the central repository for performance metrics that are received from multiple flow engines 102.

As indicated above, the runtime system 100 drives optimal branch ordering in a flow, either in a statically configured manner or in an adaptive manner based on gathered metrics. With respect to the adaptive manner, the flow engine 104, via the runtime branch collector 112 gathers and stores performance metrics of flow branch behavior for executed flows in one or more runtime systems (e.g., runtime system 100) over a period of time. Metrics include information that identifies the statistical data representing the flow execution. A metric may be any type of measure, such as a count, an elapsed time, or other measurable attribute. Performance metrics identify the overall quality of the flow execution. For example, the metrics gathered may include load values that reflect time spent completing a flow branch (an average load value may be calculated by averaging load values for multiple activated flow branches). The global runtime branch switch director 104 uses aggregated performance metrics (e.g., a calculated average, maximum, minimum, sum, or number of occurrence of an instance across multiple runs of a process flow) relating to the flow branch behavior to determine an optimal ordering of branches for a currently running flow. Flow branch behavior may include identifying common branches taken in a flow, time elapsed while waiting for a particular branch execution to complete, etc.

In an exemplary embodiment, using the adaptive manner for driving optimal branching ordering, the global runtime branch switch director 104 identifies one or more branch points in the currently running flow and generates ordering permutations for at least a portion of the branches in the branch point(s) of the currently running flow to identify any permutations that have not been executed. Alternatively, instead of performing the identification of the branch points and/or generating ordering permutations during runtime as described above, the global runtime branch switch director 104 may implement these steps, e.g., when the flow is initially built, upon the first execution of the flow, on demand, etc.

A branch point may be referred to as a location within a flow from which one or more branches are derived. For example, a branch point "1" may have three branches, "A," "B," and "C." One permutation of branch point "1" is "A," "B," "C." Another permutation for branch point "1" is "B," "C," "A." A further permutation is "C," "B," "A." A permutation of a branch point may refer to specific path, or sequence of tasks, for a flow (ordering), when a particular branch is taken. The global runtime branch switch director 104 gathers metrics for permutations of one or more branch points in the currently running flow. If no metrics are available for a given permutation, the permutation may be executed in order to gather metrics. Examples of metrics that may be gathered include measurable attributes, such as a counter number, and elapsed time (e.g., time elapsed in executing an instruction or flow associated with permutation, etc.), to name a few. The metrics gathered are compared to performance metrics of executed flows having substantially similar flow branch behavior (e.g., flows having commonly-executed branches, common elapsed periods of time waiting for branch execution, etc.). Performance metrics identify the overall quality of the flow execution, e.g., average load values indicating time spent completing multiple flow branches. This may be implemented by searching the global runtime metric collector 106 for similar flows. The global runtime branch switch director 104 identifies optimal branch ordering for the permutations based upon the comparison. For example, the optimal branch ordering may be determined by identifying a permutation from the stored performance metrics that, based upon past executions, is determined to execute faster than other permutations from the stored performance metrics or is determined to use fewer resources to complete than other permutations from the stored performance metrics. The flow is then executed according to the optimal branch ordering. It will be understood that the branch logic may potentially repeat multiple times, once for each branch at a decision point.

The runtime branch collector 112 stores statistical data for the current flow, and the global runtime metric collector 106 is updated with the statistical data reflecting execution of the flow using the optimal branch ordering.

As indicated above, the runtime system 100 may also implement optimal branch ordering in a statically configured manner. The global runtime branch switch director 104 may include program code that determines optimal branch ordering based upon an understanding of the behavior of various flow types and their branches.

The global runtime branch switch director 104 identifies flow branch behavior for flows in the runtime system 100. In an exemplary embodiment, the flow branch behavior includes locations in a flow where clones are taken. The global runtime branch switch director 104 reduces the number of clones otherwise created at runtime by selecting any branches that, upon execution, would require cloning of data associated with another branch, and instructs the flow engine 102 to execute the selected branches before executing the other branch.

In an exemplary embodiment, the global runtime branch switch director 104 also identifies flow branch behavior by identifying asynchronous and synchronous service calls in a flow, determining a runtime of the asynchronous and synchronous service calls using a corresponding timeout value, and ordering execution of the asynchronous and synchronous service calls, using the time out value, such that short-lived synchronous calls are executed while waiting for long-lived asynchronous service calls in the flow. The time out value may refer to a time interval allocated for an event to occur or complete before the corresponding operation is interrupted.

Figure 2:
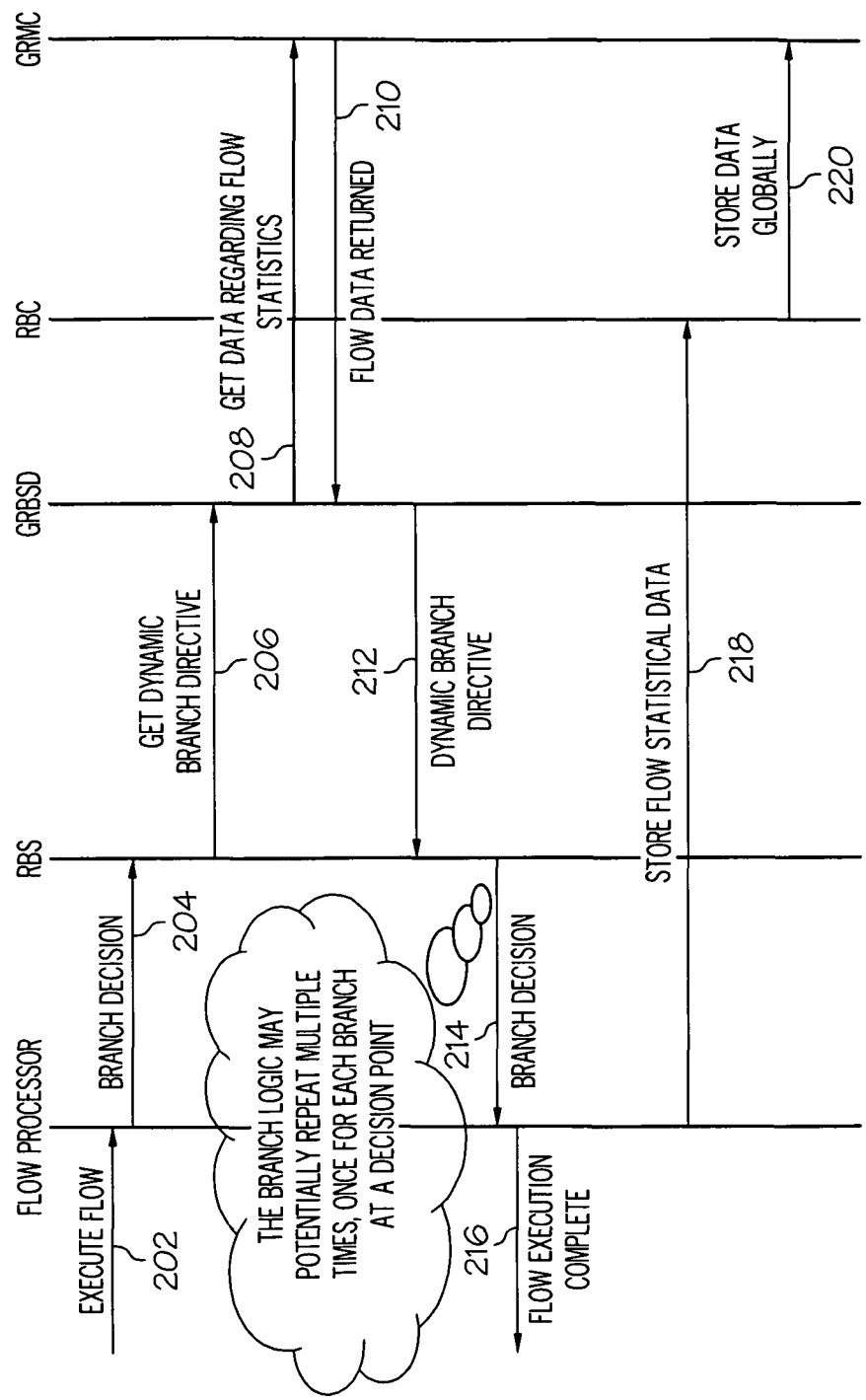
FIG. 2 is a flow diagram describing a process for optimizing branch selection in a flow process using adaptive branch ordering in accordance with an exemplary embodiment.

Turning now to FIG. 2, an exemplary flow diagram describing a process for optimizing adaptive branch selection in a flow process will now be described. At step 202, the whole flow (including all of the corresponding branches) is executed. At step 204, a branch is encountered so the RBS 108 needs to make a decision on which branch to take. The RBS 108 contacts the GRBSD 104 to look for information concerning the branch at step 206.

At step 208, the GRBSD 104 refers to the global statistics collated by the GRMC 106 and, at step 210, the global statistics are turned to the GRBSD 104, which processes the information and makes a decision on the current branch decision in context. At step 212, the GRBSD 104 informs the RBS 108 of its decision. At step 214, the RBS 108 acts on the decision rendered in step 212. The processes described in steps 204-214 may be repeated for each of the branches at the given point in the flow.

At step 216, the flow continues along the branch directed by the RBS in step 214. At step 218, the information about the particular branch taken is now stored by the local RBC 112. At step 220, the RBC 112 defers the information to the GMRC 106, thus adding to the historical information upon which the next decision at step 204 will be made.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for optimizing runtime branch selection in a flow process of an enterprise service bus of a service-oriented architecture, comprising:

gathering, by a runtime branch collector, performance metrics of flow branch behavior for executed flows in a runtime system of the enterprise service bus of the service-oriented architecture over a period of time;

passing the performance metrics for the flow branch behavior from the runtime branch collector to a global runtime metric collector, the global runtime metric collector comprising a central repository for containing performance metrics for a plurality of types of flows and flow branches as routes of messages in the runtime system of the enterprise service bus;

using, by a global runtime branch switch director, the performance metrics for the flow branch behavior from the global runtime metric collector to determine an optimal ordering of branches for a currently running flow of the enterprise service bus of the service-oriented architecture, comprising:

identifying a branch point in the currently running flow by the global runtime branch switch director, the branch point having two or more branches that are taken from the branch point according to a branch ordering;

generating all ordering permutations, by the global runtime branch switch director, for at least a portion of the branches in the branch point for the currently running flow and identifying any permutations that have not been executed from the ordering permutations;

gathering metrics, by the runtime branch collector, for at least one permutation of the branch point in the currently running flow;

comparing the metrics to performance metrics of executed flows having substantially similar flow branch behavior by searching the global runtime metric collector for similar flows; and identifying, by the global runtime branch switch director, optimal branch ordering for the permutation based upon the comparison and data associated between the two or more branches; and executing the flow, by a flow engine, according to the optimal branch ordering as directed by the global runtime branch switch director such that a runtime branch switch of the flow engine is directed with the optimal branch ordering at each branch encountered.

2. The method of claim 1, wherein the optimal branch ordering is determined by identifying a permutation from the stored performance metrics that, based upon past executions, is determined to execute faster than other permutations from the stored performance metrics or is determined to use fewer resources to complete than other permutations from the stored performance metrics.

3. The method of claim 2, wherein gathering the metrics includes gathering load values that reflect time spent completing a flow branch;

wherein an average load value is calculated by averaging load values for multiple activated flow branches.

4. The method of claim 2, wherein gathering the metrics includes identifying common branches taken in a flow.

5. The method of claim 1, further comprising:
updating the stored performance metrics with statistical data reflecting execution of the flow using the optimal branch ordering.

6. The method of claim 1, wherein the permutation indicates a path of the branch point and reflects a particular sequence of tasks in the flow.

7. A method for optimizing runtime branch selection in a statically-configured flow process of an enterprise service bus of a service-oriented architecture, comprising:
identifying, by a global runtime branch switch director of a runtime system, flow branch behavior for flows in the runtime system of the enterprise service bus of the service-oriented architecture for instantiating conceptual flows of an application, the flow branch behavior including locations in a flow where clones of data are taken;
reducing, by the global runtime branch switch director, the number of clones of data otherwise created at runtime of the enterprise service bus by selecting any branches that, upon execution, would require cloning of data associated with another branch having a common branch point, wherein each branch represents a different route of messages in the runtime system of the enterprise service bus; and
instructing, by the global runtime branch switch director, a flow engine of the runtime system to execute the selected branches before executing the other branch by changing a branch ordering at the common branch point.

8. The method of claim 7, wherein identifying flow branch behavior in a runtime system further includes:
identifying asynchronous and synchronous service calls in a flow;
determining a runtime of the asynchronous and synchronous service calls using a corresponding timeout value; and
ordering execution of the asynchronous and synchronous service calls, using the time out value, such that short-lived synchronous calls are executed while waiting for long-lived asynchronous service calls in the flow.

9. A system for optimizing runtime branch selection in a flow process of an enterprise service bus of a service-oriented architecture, comprising:
a computer processor; and
a runtime system application executing on the computer processor, the runtime system application implementing a method, comprising:
gathering, by a runtime branch collector, performance metrics of flow branch behavior for executed flows in a runtime system of the enterprise service bus of the service-oriented architecture over a period of time;
passing the performance metrics for the flow branch behavior from the runtime branch collector to a global runtime metric collector, the global runtime metric collector comprising a central repository for containing performance metrics for a plurality of types of flows and flow branches as routes of messages in the runtime system of the enterprise service bus;
using, by a global runtime branch switch director, the performance metrics for the flow branch behavior from the global runtime metric collector to determine an optimal ordering of branches for a currently running flow of the enterprise service bus of the service-oriented architecture, comprising:
identifying a branch point in the currently running flow by the global runtime branch switch director, the branch point having two or more branches that are taken from the branch point according to a branch ordering;
generating all ordering permutations, by the global runtime branch switch director, for at least a portion of the branches of the branch point in the currently running flow and identifying any permutations that have not been executed from the ordering permutations;
gathering metrics, by the runtime branch collector, for at least one permutation of the branch point in the currently running flow;
comparing the metrics to performance metrics of executed flows having substantially similar flow branch behavior by searching the global runtime metric collector for similar flows; and
identifying, by the global runtime branch switch director, optimal branch ordering for the permutation based upon the comparison and data associated between the two or more branches; and
executing the flow, by a flow engine, according to the optimal branch ordering as directed by the global runtime branch switch director such that a runtime branch switch of the flow engine is directed with the optimal branch ordering at each branch encountered.

10. The system of claim 9, wherein the optimal branch ordering is determined by identifying a permutation from the stored performance metrics that, based upon past executions, is determined to execute faster than other permutations from the stored performance metrics or is determined to use fewer resources to complete than other permutations from the stored performance metrics.

11. The system of claim 10, wherein gathering the metrics includes gathering load values that reflect time spent completing a flow branch;
wherein an average load value is calculated by averaging load values for multiple activated flow branches.

12. The system of claim 10, wherein gathering the metrics includes identifying common branches taken in a flow.

13. The system of claim 9, wherein the system runtime application further implements:
updating the stored performance metrics with statistical data reflecting execution of the flow using the optimal branch ordering.

14. The system of claim 9, wherein the permutation indicates a path of the branch point and reflects a particular sequence of tasks in the flow.

15. A computer program product for optimizing runtime branch selection in a flow process of an enterprise service bus of a service-oriented architecture, the computer program product comprising a non-transitory storage medium having computer-readable program code stored thereon, the program code causing a computer to implement a method, the method comprising:
gathering, by a runtime branch collector, performance metrics of flow branch behavior for executed flows in a runtime system of the enterprise service bus of the service-oriented architecture over a period of time;
passing the performance metrics for the flow branch behavior from the runtime branch collector to a global runtime metric collector the global runtime metric collector comprising a central repository for containing performance metrics for a plurality of types of flows and flow branches as routes of messages in the runtime system of the enterprise service bus;

using, by a global runtime branch switch director, the performance metrics for the flow branch behavior from the global runtime metric collector to determine an optimal ordering of branches for a currently running flow of the enterprise service bus of the service-oriented architecture, comprising:
- identifying a one branch point in the currently running flow by the global runtime branch switch director, the branch point having two or more branches that are taken from the branch point according to a branch ordering;
- generating all ordering permutations, by the global runtime branch switch director, for at least a portion of the branches in the branch point for the currently running flow and identifying any permutations that have not been executed from the ordering permutations;
- gathering metrics, by the runtime branch collector, for at least one permutation of the branch point in the currently running flow;
- comparing the metrics to performance metrics of executed flows having substantially similar flow branch behavior by searching the runtime metric collector for similar flows; and
- identifying, by the global runtime branch switch director, optimal branch ordering for the permutation based upon the comparison and data associated between the two or more branches; and executing the flow, by a flow engine, according to the optimal branch ordering as directed by the global runtime branch switch director such that a runtime branch switch of the flow engine is directed with the optimal branch ordering at each branch encountered.

16. The computer program product of claim 15, wherein the optimal branch ordering is determined by identifying a permutation from the stored performance metrics that, based upon past executions, is determined to execute faster than other permutations from the stored performance metrics or is determined to use fewer resources to complete than other permutations from the stored performance metrics.

17. The computer program product of claim 16, wherein gathering the metrics includes gathering load values that reflect time spent completing a flow branch;
wherein an average load value is calculated by averaging load values for multiple activated flow branches.

18. The computer program product of claim 16, wherein gathering the metrics includes identifying common branches taken in a flow.

19. The computer program product of claim 15, further comprising instructions for implementing:
updating the stored performance metrics with statistical data reflecting execution of the flow using the optimal branch ordering.

20. The computer program product of claim 15, wherein the permutation indicates a path of the branch point and reflects a particular sequence of tasks in the flow.

* * * * *